(12) United States Patent
Aou et al.

(10) Patent No.: US 10,160,892 B2
(45) Date of Patent: Dec. 25, 2018

(54) SOLID, SELF-BONDABLE ORGANIC POLYMERS AND METHODS FOR USING SAME

(71) Applicant: DOW GLOBAL TECHNOLOGIES LLC, Midland, MI (US)

(72) Inventors: Kaoru Aou, Lake Jackson, TX (US); Dwight D. Latham, Clute, TX (US); Ragat Duggal, Pearland, TX (US)

(73) Assignee: Dow Global Technologies LLC, Midland, MI (US)

( * ) Notice: Subject to any disclaimer, the term of this patent is extended or adjusted under 35 U.S.C. 154(b) by 370 days.

(21) Appl. No.: 14/443,959

(22) PCT Filed: Nov. 23, 2013

(86) PCT No.: PCT/US2013/071546
§ 371 (c)(1),
(2) Date: May 19, 2015

(87) PCT Pub. No.: WO2014/092986
PCT Pub. Date: Jun. 19, 2014

(65) Prior Publication Data
US 2015/0291864 A1    Oct. 15, 2015

Related U.S. Application Data

(60) Provisional application No. 61/737,142, filed on Dec. 14, 2012.

(51) Int. Cl.
| | | |
|---|---|---|
| C08G 18/24 | (2006.01) | |
| B29C 67/24 | (2006.01) | |
| C08G 18/48 | (2006.01) | |
| C09J 175/08 | (2006.01) | |
| C09J 5/02 | (2006.01) | |
| B29C 67/02 | (2017.01) | |
| C09J 175/04 | (2006.01) | |
| B29C 65/02 | (2006.01) | |
| C09J 5/06 | (2006.01) | |
| B29K 75/00 | (2006.01) | |

(52) U.S. Cl.
CPC ............ *C09J 175/08* (2013.01); *B29C 65/02* (2013.01); *B29C 67/02* (2013.01); *B29C 67/246* (2013.01); *C08G 18/246* (2013.01); *C08G 18/4829* (2013.01); *C09J 5/02* (2013.01); *C09J 5/06* (2013.01); *C09J 175/04* (2013.01); *B29K 2075/00* (2013.01); *C09J 2475/00* (2013.01)

(58) Field of Classification Search
CPC .......... C09J 175/08; C09J 175/04; C09J 5/06; B29C 65/02; B29C 67/246; B29C 67/02; C08G 18/246; C08G 18/4829; B29K 2075/00
USPC ........................................................ 156/285
See application file for complete search history.

(56) References Cited

U.S. PATENT DOCUMENTS

| | | | | |
|---|---|---|---|---|
| 4,093,674 | A * | 6/1978 | Tsutsui ................... | C08G 18/42 427/185 |
| 4,453,997 | A * | 6/1984 | Hori .......................... | C09J 7/10 156/305 |
| 5,510,444 | A * | 4/1996 | Halpaap .............. | C08G 18/3831 428/422.8 |
| 6,187,892 | B1 * | 2/2001 | Markusch ............ | C08G 18/482 427/385.5 |
| 6,635,711 | B1 * | 10/2003 | Miskovic .................. | B32B 7/12 525/127 |
| 2007/0167600 | A1 * | 7/2007 | Rukavina ............ | B32B 17/1077 528/44 |
| 2007/0173627 | A1 * | 7/2007 | Rukavina ............ | B32B 17/1077 528/44 |
| 2007/0251421 | A1 * | 11/2007 | Rukavina ............ | B32B 17/1077 106/287.24 |
| 2010/0222442 | A1 * | 9/2010 | Prissok .............. | C08G 18/4854 521/60 |
| 2016/0068707 | A1 * | 3/2016 | Drijfhout ........... | C08G 18/6715 428/425.1 |

* cited by examiner

*Primary Examiner* — Michael N Orlando
*Assistant Examiner* — Christian Roldan

(57) ABSTRACT

Solid compositions made from or coated with a non-melting organic polymer having a main glass transition temperature of at least 65° C., few if any isocyanate groups and a wet aged glass transition temperature of up to 60° C. are self-bonding materials that are useful in a variety of adhesive and molding operations. Under conditions of heat and moisture, these compositions will self-bond. The compositions can be used as adhesive coatings, which are solid and non-tacky and thus can be transported and stored easily under ambient conditions. These compositions are especially useful in applications in which, due to the location and/or orientation of the substrates, liquid or melting materials cannot be applied easily or will run off the substrates.

12 Claims, No Drawings

SOLID, SELF-BONDABLE ORGANIC POLYMERS AND METHODS FOR USING SAME

This invention relates to self-bondable compositions, and to methods for using same.

Organic polymers of many types are used as adhesives. The adhesives can generally be categorized into liquid or pasty types, which cure or dry to form an adhesive layer, and hot melt types, which are low-melting thermoplastics that are melted and subsequently re-solidified to form an adhesive bond. Some powder coatings are low-melting, low glass transition temperature materials that form an adhesive at by first by melting, which allows it to wet out and cover the substrate surface, and then by curing to form a thermoset. What is common to all of these adhesives is that they are liquids at some point of the adhesion process.

There are certain applications in which none of these types can be used easily. There may be several reasons for this. In some cases, it may not be possible or convenient to apply the adhesive at the point of use. This may be, for example, because of the location where the bonding is performed. There may not be, for example, suitable equipment available to meter and dispense, and in some cases blend, the adhesive and/or its constituent components. In other cases, due to the location and/or orientation of the substrates being bonded, these types of adhesives cannot be applied to the substrates during the bonding process, or once applied, cannot be retained on those substrates. For example, under certain circumstances, the adhesive can flow away from the bondline due to gravitation or other forces, or may become washed away due to the flow of a surrounding fluid such as a moving gas or liquid.

What would be highly desirable in these applications would be a material that can bond to itself under pre-defined circumstances, or is coated with such a self-bonding material. The self-bonding material preferably would be a solid, non-tacky material under ordinary conditions of storage and use, so the material could be warehoused and transported easily without special precautions. The self-bonding material would be capable of bonding to itself under predefined conditions, without melting or degrading to form a liquid that can run off. Such a material could allow for the assembly of large bonded masses without the need for liquid metering, mixing and dispensing equipment. The material could be formed into small particles that could be poured or pumped in a slurry to where they are needed, and then subjected to bonding conditions.

In one aspect, this invention is a method for forming a bonded mass of adhered solid pieces, comprising:

a) forming a mass of two or more separate solid pieces, such that a contacting surface of each of said solid pieces is in contact with a contacting surface of one or more adjacent solid pieces at one or more bondlines, wherein said contacting surfaces each are of a solid, non-thermoplastic organic polymer having a dry glass transition temperature as measured by dynamic mechanical thermal analysis of 40 to 130° C., a density of at least 500 kg/m³, no more than 0.25% by weight isocyanate groups and a wet aged glass transition temperature, as measured by dynamic mechanical thermal analysis, at least 15° C. lower than the main glass transition temperature but no greater than 60° C.; and b) heating the mass to a temperature at least equal to the wet aged glass transition temperature in the presence of water and applied pressure to bond the solid pieces at the bondline or bondlines to form the bonded mass.

In some embodiments, the invention is a method for forming a bonded mass of adhered solid pieces, comprising:

a) forming a coating of a solid, non-thermoplastic organic polymer having a main glass transition temperature as measured by dynamic mechanical thermal analysis of 40 to 130° C., a density of at least 500 kg/m³, no more than 0.25% by weight isocyanate groups and a wet aged glass transition temperature, as measured by dynamic mechanical thermal analysis, at least 15° C. lower than the main glass transition temperature but no greater than 60° C. onto multiple substrate pieces to form coated substrate pieces;

b) forming a mass of the coated substrate pieces such that a coated surface of each of said solid pieces is in contact with a coated surface of one or more adjacent solid pieces at one or more bondlines; and c) heating the mass to a temperature at least equal to the wet aged glass transition temperature in the presence of water and applied pressure to bond the coated solid pieces at the bondline or bondlines to form the bonded mass.

In some embodiments, the invention is also a method for forming a bonded mass of adhered solid pieces, comprising:

a) forming a mass of two or more separate solid pieces, such that a contacting surface of each of said solid pieces is in contact with a contacting surface of one or more adjacent solid pieces at one or more bondlines, wherein said contacting surfaces each are of a solid, non-thermoplastic organic polymer produced in a reaction of a reaction mixture containing at least one liquid polyol and at least one liquid polyisocyanate compound in which the isocyanate index is 0.3 to 0.9, the organic polymer having a main glass transition temperature as measured by dynamic mechanical thermal analysis of 40 to 130° C., a density of at least 500 kg/m³ and no more than 0.25% by weight isocyanate groups; and b) heating the mass at a bonding temperature of at least 40° C. in the presence of water and applied pressure to bond the solid pieces at the bondline or bondlines to form the bonded mass.

In still other embodiments, the invention is a method for forming a bonded mass of adhered solid pieces, comprising:

a) applying a reactive mixture of at least one liquid polyol and at least one liquid polyisocyanate compound in which the isocyanate index is 0.3 to 0.9 to the surface of multiple substrate pieces, and curing the reactive mixture to form multiple substrate pieces coated with a solid, non-melting polymer having a main glass transition temperature as measured by dynamic mechanical thermal analysis of 40° C. to 130° C., a density of at least 500 kg/m³ and no more than 0.25% by weight isocyanate groups;

b) forming a mass of the coated substrate pieces such that a contacting surface of each of said coated substrate pieces is in contact with a contacting surface of one or more adjacent coated substrate pieces at one or more bondlines; and c) heating the mass at a bonding temperature of at least 40° C. in the presence of water and applied pressure to bond the coated substrate pieces at the bondline or bondlines to form the bonded mass.

The invention provides a way to adhere pieces of a solid material to each other, and/or to form agglomerated and bonded masses from multiple pieces of a solid material, without the need to melt the material or apply liquid adhesive materials during the bonding step. The invention provides solid, non-tacky materials that can be stored and transported under ambient conditions without bonding to each other or sticking together, yet which will bond to each other under conditions of elevated temperature, moisture and applied pressure. This permits the material to be handled as an ordinary solid. The materials can be formed into pieces of any convenient size, from small granules to large blocks, which then can bonded together at the time and place where needed. This approach is very unusual, because solid, non-melting, thermoset solid polymers have not been previously known to bond to themselves or form useful adhesives of any type.

The invention is particularly suitable for forming agglomerated masses of particles. The invention, for example, provides a dry particulate material that can be placed into a mold and heated under pressure in the presence of moisture to form a molded article.

The organic polymer which forms the contacting surfaces of the invention is characterized in several respects. It is a solid material, by which it is meant the polymer that does not melt or degrade at any temperature below its main glass transition temperature as described below.

The organic polymer has a dry glass transition temperature as measured by dynamic mechanical thermal analysis of 40 to 130° C. The dry glass transition temperature is preferably at least 65° C. When the glass transition temperature is below about 65° C., the polymer may soften or become tacky during ordinary storage and/or transportation conditions, and special conditions such as refrigeration may be needed in such a case. The main glass transition temperature may be as much as 130° C. and preferably is not greater than 110° C. In particular embodiments, the main glass transition temperature may be from 65 to 100° C.

For purposes of this invention, glass transition temperatures are measured by dynamic mechanical thermal analysis (DMTA) at an oscillation frequency of 1 Hertz and a heating scan rate at 3° C./second from 20° C. to 200° C. The main dry glass transition temperature is taken prior to any wet aging as described below. The temperature corresponding to the peak of the tan delta curve is taken as the glass transition temperature ($T_g$) of the specimen tested, except in cases in which the tan delta value of two transitions are no different than 5% from one another, in which case the lower transition temperature is taken as the main glass transition temperature. The organic polymer may exhibit, in addition to the main glass transition temperature, other transitions that are seen on DMTA at higher or lower temperatures than the "main" glass transition temperature.

The organic polymer has density of at least 500 kg/m$^3$, which means that it is substantially non-cellular. The density is more preferably at least 750 kg/m$^3$. Organic polymers having a density of at least 850 kg/m$^3$ are especially preferred.

The organic polymer contains no more than 0.25% by weight isocyanate groups, preferably no more than 0.1% by weight isocyanate groups and more preferably no more than 0.01% by weight isocyanate groups.

The organic wet aged glass transition temperature is at least 15° C. lower than the main dry glass transition temperature, but no greater than 60° C. The wet aged glass transition temperature may be, for example, from −20 to 60° C., or from 0° to 60° C., or 20 to 60° C. or 20 to 50° C. The wet aged glass transition temperature is measured by immersing a sample of the polymer in deionized water at 50° C. for 18 hours and then measuring the glass transition temperature of the polymer by DMTA as described before.

In some embodiments, the organic polymer is a polymer formed in the reaction of at least one polyol and at least one organic polyisocyanate, at an isocyanate index of 0.3 to 0.9. Such an organic polymer is a solid having a density and main glass transition temperature as described already.

The polyisocyanate preferably has an average functionality from about 1.9 to 4, and more preferably from 2.0 to 3.5 and still more preferably from 2.2 to 3.5. The average isocyanate equivalent weight can be from about 80 to 500, is more preferably from 80 to 200 and still more preferably from 125 to 175. The polyisocyanates can be aromatic, aliphatic and/or cycloaliphatic. Exemplary polyisocyanates include, for example, m-phenylene diisocyanate, 2,4- and/or 2,6-toluene diisocyanate (TDI), the various isomers of diphenylmethanediisocyanate (MDI), hexamethylene-1,6-diisocyanate, tetramethylene-1,4-diisocyanate, cyclohexane-1,4-diisocyanate, hexahydrotoluene diisocyanate, hydrogenated MDI (H$_{12}$ MDI), naphthylene-1,5-diisocyanate, methoxyphenyl-2,4-diisocyanate, 4,4'-biphenylene diisocyanate, 3,3'-dimethoxy-4,4'-biphenyl diisocyanate, 3,3'-dimethyldiphenylmethane-4,4'-diisocyanate, 4,4',4''-triphenylmethane triisocyanate, polymethylene polyphenylisocyanates, hydrogenated polymethylene polyphenylisocyanates, toluene-2,4,6-triisocyanate, and 4,4'-dimethyl diphenylmethane-2,2',5,5'-tetraisocyanate. Preferred polyisocyanates include MDI and derivatives of MDI such as biuret-modified "liquid" MDI products and polymeric MDI.

The polyol is a compound or mixture of compounds having an average of at least 2 hydroxyl groups per molecule. To produce a polymer having the necessary glass transition temperature, the average functionality (number of hydroxyl groups per molecule) of the polyols preferably is somewhat higher, such as at least 2.5, preferably 2.5 to 6 and more preferably 3 to 4. A low average hydroxyl equivalent weight also favors the production of a polymer having the needed glass transition temperature. It is preferred that the polyol(s) have an average hydroxyl equivalent weight from 31 to 200, especially 50 to 150 and more preferably 60 to 100. If a mixture of polyols is used, some or all of the polyol(s) may have functionalities outside of the foregoing ranges; however, in such a case the mixture of polyols preferably has a functionality and hydroxyl equivalent weight as described above.

Polyols that are suitable for preparing the organic polymer include hydroxy-functional acrylate polymers and copolymers, hydroxy-functional polybutadiene polymers, polyether polyols, polyester polyols, and various polyols that are based on vegetable oils or animal fats.

Polyether polyols include, for example, polymers of propylene oxide, ethylene oxide, 1,2-butylene oxide, tetramethylene oxide, block and/or random copolymers thereof, and the like. Of particular interest are poly(propylene oxide) homopolymers and copolymers of propylene oxide and ethylene oxide in which the oxyethylene content is, for example, from about 1 to about 30% by weight.

Polyester polyols include reaction products of polyols, preferably diols, with polycarboxylic acids or their anhydrides, preferably dicarboxylic acids or dicarboxylic acid anhydrides. The polycarboxylic acids or anhydrides may be aliphatic, cycloaliphatic, aromatic and/or heterocyclic and may be substituted, such as with alkyl, aryl or halogen. The polycarboxylic acids may be unsaturated. Examples of these polycarboxylic acids include succinic acid, adipic acid, terephthalic acid, isophthalic acid, trimellitic anhydride, phthalic anhydride, maleic acid, maleic acid anhydride and fumaric acid. The polyols used in making the polyester polyols preferably have an equivalent weight of 150 or less, preferably 75 or less, and include ethylene glycol, 1,2- and 1,3-propylene glycol, 1,4- and 2,3-butane diol, 1,6-hexane diol, 1,8-octane diol, neopentyl glycol, cyclohexane dimethanol, 2-methyl-1,3-propane diol, glycerine, trimethylol propane, 1,2,6-hexane triol, 1,2,4-butane triol, trimethylolethane, pentaerythritol, quinitol, mannitol, sorbitol, methyl glycoside, diethylene glycol, triethylene glycol, tetraethylene glycol, dipropylene glycol, dibutylene glycol and the like. Polycaprolactone polyols are useful.

Other useful polyols include castor oil and compounds having a hydroxyl equivalent weight of 30 to 125, such as ethylene glycol, diethylene glycol, triethylene glycol, 1,2-propylene glycol, 1,3-propylene glycol, 1,4-butane diol, 1,6-hexane diol, neopentyl glycol, dipropylene glycol, tripropylene glycol, cyclohexanedimethanol, triethanolamine, tri(isopropanol) amine, glycerine, trimethylol propane, trimethylol ethane, pentaerythritol, sucrose, sorbitol, and alkanolamines such as diethanol amine, diisopropanol amine, monoethanol amine, monoisopropanolamine, alkoxylates of any of the foregoing, and the like.

The isocyanate index (the ratio of equivalents of isocyanate groups to hydroxyl groups) preferably is 0.4 to 0.8 and more preferably from 0.45 to 0.65.

The organic polymer is made by partially curing the mixture of polyol(s) and organic polyisocyanate(s). Polyols and polyisocyanates often react spontaneously and exothermically when mixed at room temperature, although faster reaction rates usually are achieved when elevated temperatures are used. The polyol/polyisocyanate reaction preferably is performed in the presence of a urethane catalyst, which catalyzes the reaction of hydroxyl groups with isocyanate groups. This urethane catalyst preferably is at most a weak catalyst for the isocyanate trimerization reaction.

The resulting polymer will contain urethane linkages produced in the reaction of the hydroxyl group of the polyol with the isocyanate groups. The polymer may in addition contain linkages produced in the reaction of two or more isocyanate groups with each other, including carbodiimide, isocyanurate, biuret, allophonate, and uretidinedione groups, and may also include urea groups.

Examples of urethane catalysts include tertiary amines, tin carboxylates; organotin compounds; tertiary phosphines; various metal chelates; metal salts of strong acids, such as ferric chloride, stannic chloride, stannous chloride, antimony trichloride, bismuth nitrate and bismuth chloride, and the like. Tertiary amine and tin catalysts are generally preferred.

Representative tertiary amine catalysts include trimethylamine, triethylamine, N-methylmorpholine, N-ethylmorpholine, N,N-dimethylbenzylamine, N,N-dimethylethanolamine, N,N,N',N'-tetramethyl-1,4-butanediamine, N,N-dimethylpiperazine, 1,4-diazobicyclo-2,2,2-octane, bis(dimethylaminoethyl)ether, bis(2-dimethylaminoethyl) ether, morpholine,4,4'-(oxydi-2,1-ethanediyl)bis, triethylenediamine, pentamethyl diethylene triamine, dimethyl cyclohexyl amine, N-cetyl N,N-dimethyl amine, N-cocomorpholine, N,N-dimethyl aminomethyl N-methyl ethanol amine, N,N,N'-trimethyl-N'-hydroxyethyl bis(aminoethyl) ether, N,N-bis(3-dimethylaminopropyl)N-isopropanolamine, (N,N-dimethyl) amino-ethoxy ethanol, N,N,N', N'-tetramethyl hexane diamine, 1,8-diazabicyclo-5,4,0-undecene-7, N,N-dimorpholinodiethyl ether, N-methyl imidazole, dimethyl aminopropyl dipropanolamine, bis(dimethylaminopropyl)amino-2-propanol, tetramethylamino bis (propylamine), (dimethyl(aminoethoxyethyl))((dimethyl amine)ethyl)ether, tris(dimethylamino propyl) amine, dicyclohexyl methyl amine, bis(N,N-dimethyl-3-aminopropyl) amine, 1,2-ethylene piperidine and methyl-hydroxyethyl piperazine.

Examples of useful tin-containing catalysts include stannous octoate, dibutyl tin diacetate, dibutyl tin dilaurate, dibutyl tin dimercaptide, dialkyl tin dialkylmercapto acids, dibutyl tin oxide, dimethyl tin dimercaptide, dimethyl tin diisooctylmercaptoacetate, and the like.

The catalysts are typically used in small amounts, such as 0.0015 to 5, preferably from 0.01 to 1 part by weight per 100 parts by weight of polyol(s) plus polyisocyanate(s). Tin-containing catalysts are typically used in amounts towards the low end of these ranges.

The polymerization is performed until the organic polymer has polymerized enough to form a solid, non-melting polymer having a main glass transition temperature as described before, and to reduce the isocyanate content to no greater than 0.25% by weight. The organic polymer preferably has an isocyanate content of no more than 0.1% by weight and more preferably no more than 0.01% by weight. The polymer may have no measurable quantity of isocyanate groups. Isocyanate content can be determined by well-known titration methods, or using calibrated spectroscopic methods.

Because the isocyanate index is significantly below 1.0, the reaction of polyol and polyisocyanate is incomplete. The organic polymer that forms is believed to contain mainly oligomeric materials which are branched and/or crosslinked. The molecular weight can be quite low in some embodiments, such as, for example in the range of 500 to 20,000 (number average). The organic polymer may contain a quantity of unreacted polyol compounds. This is believed to be the case particularly when the polymer is prepared at an isocyanate index at the lower end of the range, such as 0.3 to 0.6. The presence of these unreacted polyol compounds is not problematic, provided that the organic polymer forms a solid material having the necessary glass transition temperature.

The organic polymer can be polymerized to form articles of any convenient size and shape. For example, the organic polymer can be polymerized into flat plaques, molded blocks of any convenient dimension, or any other convenient shape. The articles can be used in the molding process as produced, or can be cut into smaller pieces as may be wanted for any particular molding process. Alternatively, the organic polymer can be polymerized into small pieces or particles.

The organic polymer also can be formed as a coating onto a substrate. The substrate can be any convenient size and geometry ranging from large blocks to fibers to small particulates such as, for example, sand particles. The coating of the organic polymer can be formed by applying a polymer-forming mixture as described above to a surface or surfaces of the substrate, and partially curing mixture as described before while it is on the substrate surface(s). The coating operation can be performed in a mold (which is suitable for larger substrates) or can be performed using various spraying, painting or other coating techniques. Small substrates can be coated by immersing them in the reaction mixture. Curing is performed by separating the reaction mixture-coated particles before curing the reaction mixture, and/or by agitating the substrate particles as the reaction mixture cures to prevent unwanted agglomeration.

A wide variety of materials can be used as such a substrate. All that is necessary is that the substrate is a solid under the conditions of the coating process, and that the substrate does not dissolve or undesirably degrade or react under the conditions of the curing reaction. The substrate may react with one or more components of the reaction mixture, to form bonds between substrate and coating. Examples of substrates include, for example, metals, ceramic materials, sand, clay, rock, stone, other organic polymers, wood or other plant material, various composites materials and the like. The coating thickness can range, for example from 0.1 μm to 15 cm or more, as desirable for the particular application. In specific applications, the coating thickness can be 100 μm to 2.5 mm, or from 250 μm to 1 mm.

According to the invention, individual pieces of the organic polymer are bonded through the application of heat in the presence of moisture and applied pressure.

The temperature in the bonding step is at least as high as the wet aged glass transition temperature. It preferably is at least 40° C. It may be as high as 100° C., but is preferably at least 20° C. below the main glass transition temperature. A preferred bonding temperature is 40 to 80° C., especially 40 to 65° C.

The moisture can be provided in the form of liquid water and/or water vapor, or even as steam. The pieces to be bonded can be wetted using liquid water prior to starting the bonding process, and then bonded in the presence of that liquid water. Water can be supplied throughout the bonding process if desired. Enough water should be provided to wet out the contacting surfaces. The pieces can be immersed in water if desired.

The individual pieces are placed into contact with each other during the bonding step. Pressure is applied to facilitate close contact and thus promote the bonding. The applied pressure may be, for example, at least 5 MPa, at least 10 MPa or at least 20 MPa. Any greater pressure can be used.

The temperature, pressure and moisture conditions are maintained long enough to bond the pieces. The needed time may range from as little as a few minutes for smaller pieces to up to several hours for large pieces and/or pieces which have a large bond line. Longer times may be needed at lower applied pressures.

Although the invention is not limited to any theory, it is believed that under conditions of elevated temperature, applied moisture and pressure, some water infuses into the polymer and in doing so decreases its glass transition temperature (at least at the contact surfaces) to a value close to the temperature of the bonding step. Once the glass transition temperature becomes depressed in this way, the contacting surfaces are able to bond to each other to adhere the individual pieces at their contacting surfaces to form a cohesive mass. The glass transition temperature of the dry organic polymer (prior to wet aging) often and preferably is significantly higher than those typically encountered during storage and transportation, and in such cases the polymer pieces are quite resistant to sticking together ("blocking") during ordinary storage and transportation.

The invention is useful in a variety of adhesive, molding or assembly applications. An organic polymer coating as described herein can be applied to the surfaces of a wide variety of substrates, which can be bonded together by contacting their coated surfaces together in the presence of moisture and heat as described. Thus, this invention can replace, for example, powder coatings, adhesive films, hot melt adhesives and liquid and/or pasty adhesives in a wide variety of applications. The invention also can be used in molding processes by filling a mold with individual particles of the organic polymer or coated with the organic polymer, applying water, and heating the particles in the mold to bond them together to form a molded article.

The following examples are provided to illustrate the invention, and are not intended to limit the scope thereof. All parts and percentages are by weight unless otherwise indicated.

EXAMPLE 1

25 parts of an 85 equivalent weight, trifunctional glycerine-initiated poly (propylene oxide) polyol, 2.61 parts of a 2.7 functionality, 134 isocyanate equivalent weight polymeric MDI and 0.05 of a tin catalyst are mixed together at room temperature. The isocyanate index is 0.66. 2.5×10 cm aluminum plates are coated by immersing it in the liquid mixture and then placing the coated plates in an 80° C. oven for 30 minutes to cure the reaction mixture. A solid, non-cellular polyurethane film forms on the surface of the aluminum plates.

Another portion of the reaction mixture is poured onto a plaque mold, cured at 80° C. for 30 minutes, and the glass transition temperature is measured by DMTA. The polymer exhibits a main $T_g$ of 97° C.

Two of the coated aluminum plates are stacked crosswise to form a 2.5×2.5 cm overlap area. A 2.7 kg weight is placed atop the stack, and the entire assembly is placed in a 50° C./35% relative humidity oven for 18 hours. The plates separate easily upon removal from the oven. This test simulates summer warehousing and transportation conditions; the ready separation of the plates indicates that little or no blocking will occur under those conditions.

Another two of the coated aluminum plates are immersed in deionized water in a 50° C. oven for 18 hours. The plates are removed, stacked crosswise to form a 2.5×2.5 cm overlap area, wrapped in a wet paper towel, placed in a closed plastic bag, and then compressed in a press under a force of about 62 MPa for about six hours. The plates are firmly adhered to each other when removed from the press. Some delamination can be observed when the plates are pulled apart with sufficient force, which indicates that the strength of the coating-coating bond exceeds that between the coating and substrate.

EXAMPLES 2-7

Plaques 2-5 are made by curing mixtures of an 85 equivalent weight, trifunctional glycerine-initiated poly (propylene oxide) polyether polyol, a 3.0 functional, 136 equivalent weight polymeric MDI and a catalyst at 80° C. for 30 minutes. The isocyanate index is as set forth in Table 1. Solid, non-cellular polymers are obtained in each case. The main glass transition temperature is measured as before. The wet aged glass transition temperature is measured for Examples 4 and 5. Results are as indicated in Table 1.

Plaques 6 and 7 are made by curing mixtures of a 4.5-functional, 156 equivalent weight poly(propylene oxide) polyol with a 3.0 functional, 136 equivalent weight polymeric MDI at a 0.653 index or 0.745 index, respectively, at 80° C. in the presence of a catalyst. As before, solid, non-cellular polymers are obtained. Dry and wet aged glass transition temperatures are as indicated in Table 1.

TABLE 1

|  | Example No. | | | | | |
| --- | --- | --- | --- | --- | --- | --- |
|  | 2 | 3 | 4 | 5 | 6 | 7 |
| Isocyanate index | 0.725 | 0.650 | 0.575 | 0.250 | 0.653 | 0.745 |
| Main $T_g$ | 103 | 90 | 69 | 43 | 45 | 55 |
| Wet Aged $T_g$ | ND | ND | 35 | 26 | 26 | 29 |

The glass transition temperatures of these materials are suitable for use in the method of the invention. As demonstrated by Examples 4-7, these materials exhibit a significantly lower wet aged glass transition temperature, similar to Example 1.

What is claimed is:

1. A method for forming a bonded mass of adhered solid pieces, comprising:
    a) forming a mass of two or more separate solid pieces, such that a contacting surface of each of said solid pieces is in contact with a contacting surface of one or more adjacent solid pieces at one or more bondlines, wherein said contacting surfaces each are of a solid, non-melting organic polymer having a main dry glass transition temperature as measured by dynamic mechanical thermal analysis of 40 to 130° C., a density of at least 500 kg/m$^3$, no more than 0.25% by weight isocyanate groups and a wet aged glass transition temperature, as measured by dynamic mechanical thermal analysis, at least 15° C. lower than the main dry glass transition temperature but no greater than 60° C.; and
    b) heating the mass to a temperature between 20° C. to 100° C. in the presence of water or steam and an applied pressure between 5 MPa to 20 MPa to bond the solid pieces at the bondline or bondlines to form the bonded mass.

2. The method of claim 1 wherein in step
    a) said two or more separate solid pieces are coated substrate pieces formed by forming a coating the solid, non-melting organic polymer onto multiple substrate pieces.

3. The method of claim 1, wherein the solid, non-melting organic polymer contains urethane groups.

4. The method of claim 3, wherein the solid, non-melting organic polymer has a main glass transition temperature of 65 to 110° C.

5. A method for forming a bonded mass of adhered solid pieces, comprising:
    a) forming a mass of two or more separate solid pieces, such that a contacting surface of each of said solid pieces is in contact with a contacting surface of one or more adjacent solid pieces at one or more bondlines, wherein said contacting surfaces each are of a solid, non-melting organic polymer produced in a reaction of a reaction mixture containing at least one liquid polyol and at least one liquid polyisocyanate compound in which the isocyanate index is 0.3 to 0.9, the organic polymer having a main glass transition temperature as measured by dynamic mechanical thermal analysis of 40 to 130° C., a density of at least 500 kg/m$^3$ and no more than 0.25% by weight isocyanate groups; and
    b) heating the mass to a temperature between 20° C. to 100° C. in the presence of water or steam and an applied pressure between 5 MPa to 20 MPa to bond the solid pieces at the bondline or bondlines to form the bonded mass.

6. The method of claim 5 wherein in step
    a) the two or more separate pieces are prepared by applying the reactive mixture to the surface of multiple substrate pieces, and curing the reactive mixture to form multiple substrate pieces coated with a solid, non-melting polymer.

7. The method of claim 5, wherein the solid, non-melting organic polymer has a main glass transition temperature of 65 to 110° C. and a wet aged glass transition temperature of no greater than 60° C.

8. The method of claim 5 wherein the polyol is a compound or mixture of compounds having an average functionality of 2.5 to 6 and an average hydroxyl equivalent weight of 50 to 150.

9. The method of claim 5 wherein the polyol is a compound or mixture of compounds having an average functionality of 3 to 4 and an average hydroxyl equivalent weight of 60 to 100.

10. The method of claim 5 wherein the polyisocyanate has an average functionality from 2.2 to 3.5 and an average isocyanate equivalent weight from 80 to 200.

11. The method of claim 5 wherein the polyol is a polyether polyol and the polyisocyanate is a polymeric MDI.

12. The method of claim 5 wherein the isocyanate index is 0.45 to 0.65.

* * * * *